US012750260B2

(12) United States Patent
Rope et al.

(10) Patent No.: US 12,750,260 B2
(45) **Date of Patent: *Sep. 29, 2026**

(54) OPTIMIZING TRANSMITTER SETTINGS FOR IN-BAND ELECTRICAL INTERFACE BETWEEN HOST DEVICE AND OPTICAL MODULE USING OUT-OF-BAND ELECTRICAL INTERFACE

(71) Applicant: Marvell Asia Pte., Ltd., Singapore (SG)

(72) Inventors: Todd Rope, Thousand Oaks, CA (US); Ilya Lyubomirsky, Santa Clara, CA (US); Whay Sing Lee, Milpitas, CA (US); Arash Farhoodfar, Sunnyvale, CA (US)

(73) Assignee: Marvell Asia Pte., Ltd., Singapore (SG)

( * ) Notice: Subject to any disclaimer, the term of this patent is extended or adjusted under 35 U.S.C. 154(b) by 115 days.

This patent is subject to a terminal disclaimer.

(21) Appl. No.: 18/735,461

(22) Filed: Jun. 6, 2024

(65) Prior Publication Data

US 2024/0323064 A1 Sep. 26, 2024

Related U.S. Application Data

(63) Continuation of application No. 17/186,897, filed on Feb. 26, 2021, now Pat. No. 12,009,951.

(Continued)

(51) Int. Cl.
*H04L 25/03* (2006.01)
*G06N 20/00* (2019.01)
*H04B 10/079* (2013.01)

(52) U.S. Cl.
CPC ....... *H04L 25/03261* (2013.01); *G06N 20/00* (2019.01); *H04B 10/0795* (2013.01)

(58) Field of Classification Search
CPC .............. G06N 20/00; H04B 10/07953; H04B 10/0795; H04L 25/03343; H04L 25/03261; H04L 25/4917
See application file for complete search history.

(56) References Cited

U.S. PATENT DOCUMENTS 9,634,760 B1 4/2017 Rope
10,747,688 B2 8/2020 Jen et al.

(Continued)

FOREIGN PATENT DOCUMENTS

KR 20200012945 A 2/2020

OTHER PUBLICATIONS

U.S. Appl. No. 17/186,897, filed Feb. 26, 2021.

(Continued)

*Primary Examiner* — Quan Tra

(57) ABSTRACT

A first host device, governing operation of an optical module, includes a transmitter, an out-of-band electrical interface, and an engine. The transmitter transmits in-band signals on an in-band electrical interface from the first host device to the optical module. The first host device communicates with a second host device over an optical medium via the optical module. The communication includes transmission by the optical module of optical signals to the second host device. The optical signals are generated based on the in-band signals. The out-of-band electrical interface transmits first out-of-band messages from the first host device to the optical module and receives second out-of-band messages from the optical module. The engine transmits one of the in-band signals on the in-band electrical interface to the optical module, receives feedback via the out-of-band electrical interface, the feedback being based on the one of the in-band signals, and based thereon tunes the transmitter.

17 Claims, 8 Drawing Sheets

Related U.S. Application Data

(60) Provisional application No. 63/055,259, filed on Jul. 22, 2020.

(56) References Cited

U.S. PATENT DOCUMENTS

| | | | | |
|---|---|---|---|---|
| 11,234,078 | B1 * | 1/2022 | Silfvast | H04R 1/1091 |
| 11,343,088 | B1 * | 5/2022 | Soh | H04B 10/61 |
| 12,009,951 | B2 | 6/2024 | Rope et al. | |
| 2004/0126107 | A1 | 7/2004 | Jay et al. | |
| 2010/0124418 | A1 | 5/2010 | Noble et al. | |
| 2012/0008938 | A1 | 1/2012 | Tang et al. | |
| 2013/0071119 | A1 | 3/2013 | Liu et al. | |
| 2013/0163989 | A1 | 6/2013 | Wu et al. | |
| 2013/0236138 | A1 | 9/2013 | Yamamoto | |
| 2016/0191275 | A1 | 6/2016 | Lyubomirsky et al. | |
| 2016/0373186 | A1 | 12/2016 | Alshinnawi et al. | |
| 2018/0083964 | A1 | 3/2018 | Guo et al. | |
| 2018/0113828 | A1 | 4/2018 | Ellis et al. | |
| 2019/0044763 | A1 | 2/2019 | Shah et al. | |
| 2019/0238250 | A1 * | 8/2019 | Tajima | H04B 10/61 |
| 2019/0319741 | A1 | 10/2019 | Smith et al. | |
| 2020/0076651 | A1 | 3/2020 | Sun et al. | |
| 2020/0228229 | A1 | 7/2020 | Farjadrad et al. | |
| 2020/0259936 | A1 | 8/2020 | Lusted | |
| 2020/0412586 | A1 | 12/2020 | Mcloughlin | |
| 2021/0006330 | A1 | 1/2021 | Mcloughlin | |
| 2022/0029865 | A1 | 1/2022 | Rope et al. | |
| 2022/0191124 | A1 | 6/2022 | Degrace et al. | |
| 2024/0039689 | A1 | 2/2024 | Meltser et al. | |

OTHER PUBLICATIONS

U.S. Appl. No. 18/217,252, filed Jun. 30, 2023, Todd Rope et al.

U.S. Appl. No. 18/239,819, filed Aug. 30, 2023, Whay Sing Lee et al.

International Preliminary Report on Patentability issued in corresponding International PCT Patent Application PCT/US2021/041807 dated Jan. 24, 2023.

IA Title: Common Electrical I/O (CEI)—Electrical and Jitter Interoperability agreements for 6G+ bps, 11G+ bps, 25G+ bps, 56G+ bps and 112G+ bps I/O, OIF Implementation Agreement OIF-CEI-05.0, Common Electrical I/O (CEI) dated May 5, 2022.

IEEE P802.3ck™M/D3.3, Draft Standard for Ethernet Amendment 4: Physical Layer Specifications and Management Parameters for 100 GB/s, 200 GB/s, and 400 GB/s Electrical Interfaces Based on 100 GB/s Signaling, prepared by the LAN/MAN Standards Committee of the IEEE Computer Society, dated Jun. 10, 2022.

Supplementary European Search Report issued in corresponding European Patent Application 21846554.0 dated Nov. 16, 2023.

Ali Ghiasi et al., "Link Training for AUI Based on OB Signaling," IEEE 802.3df Task Force, Montreal, Jul. 13, 2022.

Adee Ran et al., "AUI link training," P802.3df Electrical ad hoc, Jun. 17, 2022.

International Search Report and Written Opinion issued in corresponding PCT Application PCT/US2023/031613 dated Dec. 12, 2023.

* cited by examiner

OUT OF BAND INTERFACE
151
153
155
157
time
100
DEVICE 1
Engine
Optimiz Procedure
TX
EQ
-Setting #1, Index 1
-Setting #2, Index 2....
-Best Setting
158
150
Device 1-to-Device 2 Electrical Interface (for optimization)
Setting 1
Setting 2
154
DEVICE 2
Engine
SI Param Value Comparison
RX
SI Measure
Optical Receiver
Record 152
Record 156
-Index 1, SI Param Value1
-Index 2, SI Param Value2....

OPTIMIZING TRANSMITTER SETTINGS FOR IN-BAND ELECTRICAL INTERFACE BETWEEN HOST DEVICE AND OPTICAL MODULE USING OUT-OF-BAND ELECTRICAL INTERFACE

CROSS-REFERENCE TO RELATED APPLICATIONS

The present disclosure is a continuation of U.S. patent application Ser. No. 17/186,897, filed on Feb. 26, 2021, which claims the benefit of U.S. Provisional Application No. 63/055,259, filed on Jul. 22, 2020. The entire disclosures of the applications referenced above are incorporated herein by reference.

BACKGROUND

The present invention is directed to communication systems and methods.

Over the last few decades, the use of communication networks exploded. In the early days of the Internet, popular applications were limited to emails, bulletin board, and mostly informational and text-based web page surfing, and the amount of data transferred was usually relatively small. Today, Internet and mobile applications demand a huge amount of bandwidth for transferring photo, video, music, and other multimedia files. For example, a social network like Facebook processes more than 500 TB of data daily. To move a large amount of data, optical communication networks are often used.

Advanced electrical interfaces (e.g. PAM4 50G) call for good signal integrity at the host/module interface. Electrical transmitters have capabilities to control signal integrity through Finite Impulse Response (FIR) filters (pre- and post-cursor tap settings).

Different channel conditions (e.g., the electrical layout path from host ASIC to module ASIC) call for different settings of these FIR filters to provide optimal signal integrity. Various other parameters on the transmitter side, such as signal amplitude, may also be tuned to further optimize the channel.

Therefore, some optimization is required. This can be done:

- at Manufacturing-time, by manual calibration with a 'golden' receiver; and/or
- at Installation-time, by optimizing with the actual receivers; and/or
- during each initialization time, e.g., by using a variant of the Auto-Negotiation and Link Training (AN/LT) protocols from the IEEE 802.3 specifications (Clauses 73, 72 and other related clauses).

SUMMARY

Embodiments address optimization of an electrical interface between an optical host device and an optical module device at installation time. Certain methods try each entry in a set of FIR filter settings at the host transmitter, while asking the module to measure the signal integrity for each. The module will then provide an indication of which entry was the best choice for signal integrity in the current hardware configuration. Note that for the module to host electrical interface, this same technique can be used in reverse, whereby the host asks the module to configure its transmitting FIR filter, and the host records and keeps track of which filter setting is the best, and then configures the module with that filter setting. In both cases, for modules supporting CMIS (Common Management Interface Specification) for module configuration and control, methods are provided.

BRIEF DESCRIPTION OF DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

DESCRIPTION

The present invention is directed to communication systems and methods. According to embodiments, methods and apparatuses of optimizing communication across an electrical interface are provided.

Figure 1:
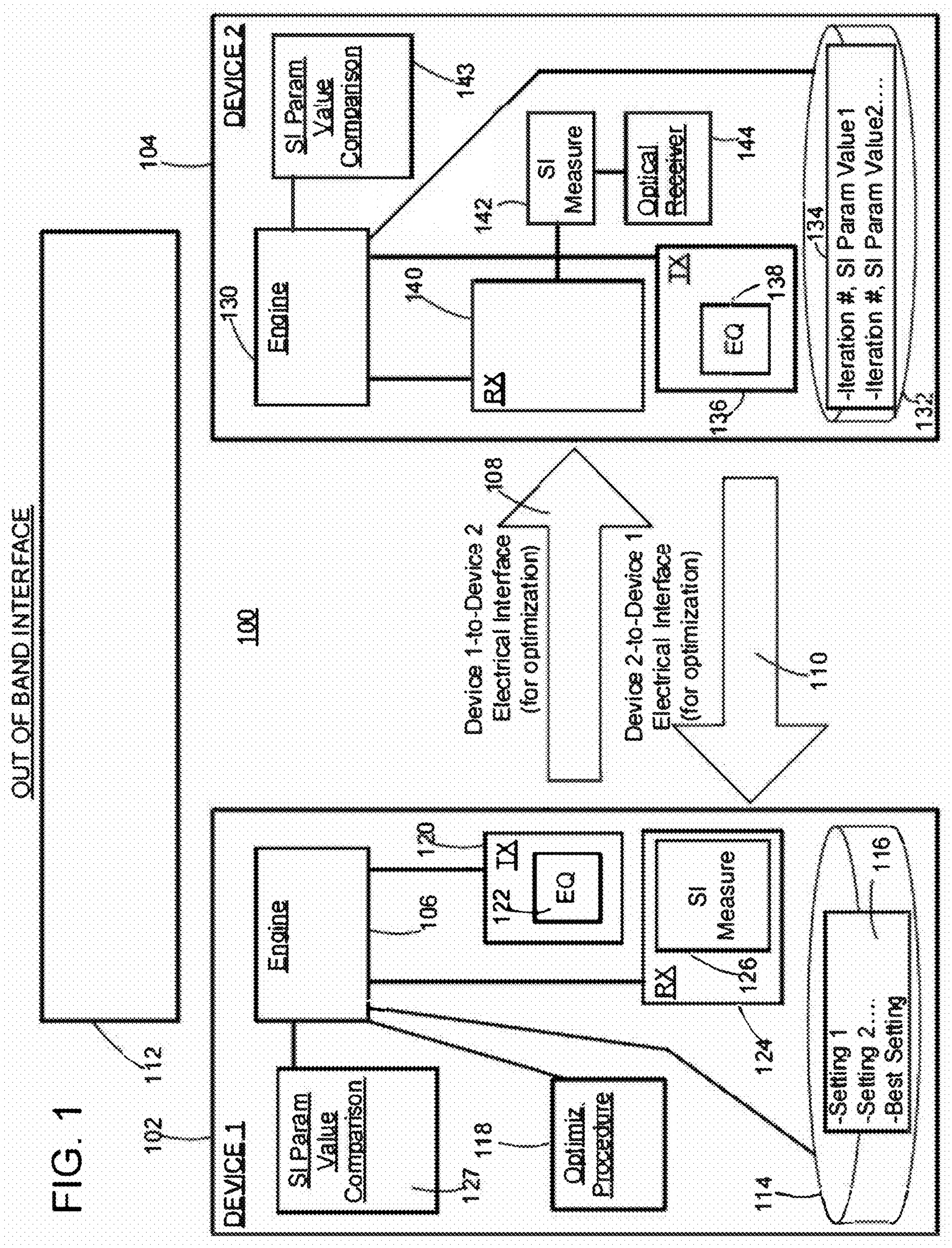
FIG. 1 illustrates a simplified block diagram of an electrical interface between a first device and a second device.

FIG. 1 illustrates a simplified block diagram of an electrical interface environment 100 between a first device 102 and a second device 104. The first device comprises a first processing engine 106 that is in communication the second device via each of the following:

first electronic interface 108,
second electronic interface 110, and
out of band interface 112.

The first device also comprises a non-transitory computer readable storage medium 114 that is configured to store optimization data 116, resulting from execution of optimization procedure 118 as described below.

The first device further comprises a transmitter 120 comprising an equalization capability 122. One example of this equalization capability is TX Eq Filter control.

However, embodiments are not limited to the optimization of TxEq setting, and each specific transmitter implementation may use any tuning paramater that is at its disposal to optimize the signal. According to one particular example, a best parameter value may be calculated using a bit error rate (BER) estimated by a forward error correction (FEC) decoder, which may or may not also be used for processing of optical signals.

Embodiments thus allow a method of conditioning transmitted signal according to a pre-determined group of settings. The transmitter is in communication with each of the first and the second electronic interfaces.

The first device further comprises a receiver 124 comprising a signal integrity monitoring capability 126 with sufficient resolution to allow a SI parameter value comparator 127 to determine a 'most preferred' incoming signal amongst the various choices from the TX side. The transmitter is in communication with each of the first and the second electronic interfaces.

The second device comprises a second processing engine 130 that is in communication the first device via the first electronic interface, the second electronic interface, and the out of band interface.

The second device also comprises a non-transitory computer readable storage medium 132 that is configured to store optimization data 134, resulting from signals received from the first device as a result of execution of the optimization procedure thereon.

The second device further comprises a transmitter 136 comprising an equalization capability 138. An example of this equalization capability is TX Eq Filter control or a method of conditioning transmitted signal according to a pre-determined group of settings. The transmitter is in communication with each of the first and the second electronic interfaces.

The second device further comprises a receiver 140 in communication with a signal integrity monitoring capability 142 having sufficient resolution to allow a signal integrity parameter comparator 143 to determine a 'most preferred' incoming signal amongst the various choices from the TX side. The receiver is in communication with each of the first and the second electronic interfaces.

According to certain embodiments, the SI measurement capability of the second device may be added for purposes of optimization of the electrical interface. According to alternative embodiments, however, the SI measurement of the second device may be already existing.

Such an existing capability may be leveraged by the optimization procedure executed on the first device, to optimize the first electrical interface. Thus in the exemplary embodiment described later below, the second device is an optical module further comprising an optical receiver 144. Accordingly, a SI measurement capability may already be extant to allow the second (optical module device) to determine SI of an incoming optical signal.

The Out of Band Interface (OOB IF) is assumed present and reliable to allow the communication of messages between the devices, outside of the first and second communication interfaces. The OOB IF is typically controlled by the first device, with the second device configured to react to messages sent from the first device.

Figure 1A:
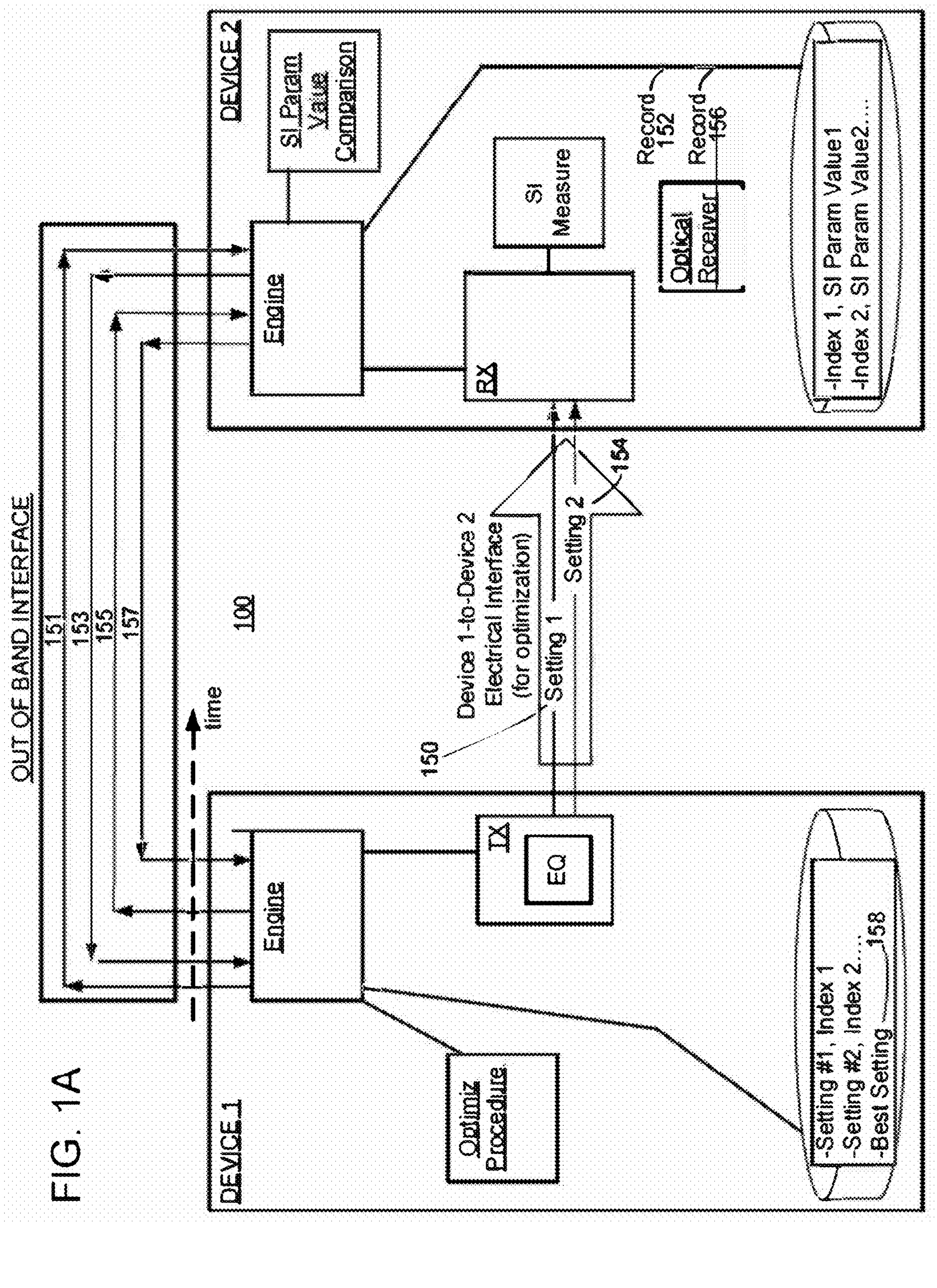
FIG. 1A is a simplified block diagram illustrating optimization of a first electrical path of the electrical interface of FIG. 1.

FIG. 1A is a simplified block diagram illustrating optimization of a first electrical interface between the first device and the second device. Here, the optimization procedure is as follows.

At 150, device 1 sets TX EQ to value at setting #1

At 151, device 1 sends out-of-band Message to begin tuning, present index=1 of 2.

At 152, device 2 tunes and records SI parameter in slot #1.

At 153, device 2 responds 'done' over out-of-band interface.

At 154, device 1 sets TX EQ to value at setting #2.

At 155, device 1 sends out-of-band Message to begin Tuning, present index=2 of 2.

At 156, device 2 tunes and record SI parameter in slot #2.

At 157, device 2 responds 'done' over out-of-band interface, along with whether index 1 or 2 was better.

At 158, device 1 sets TX EQ to setting that was reported as better, and records that best setting for future use.

Figure 1B:
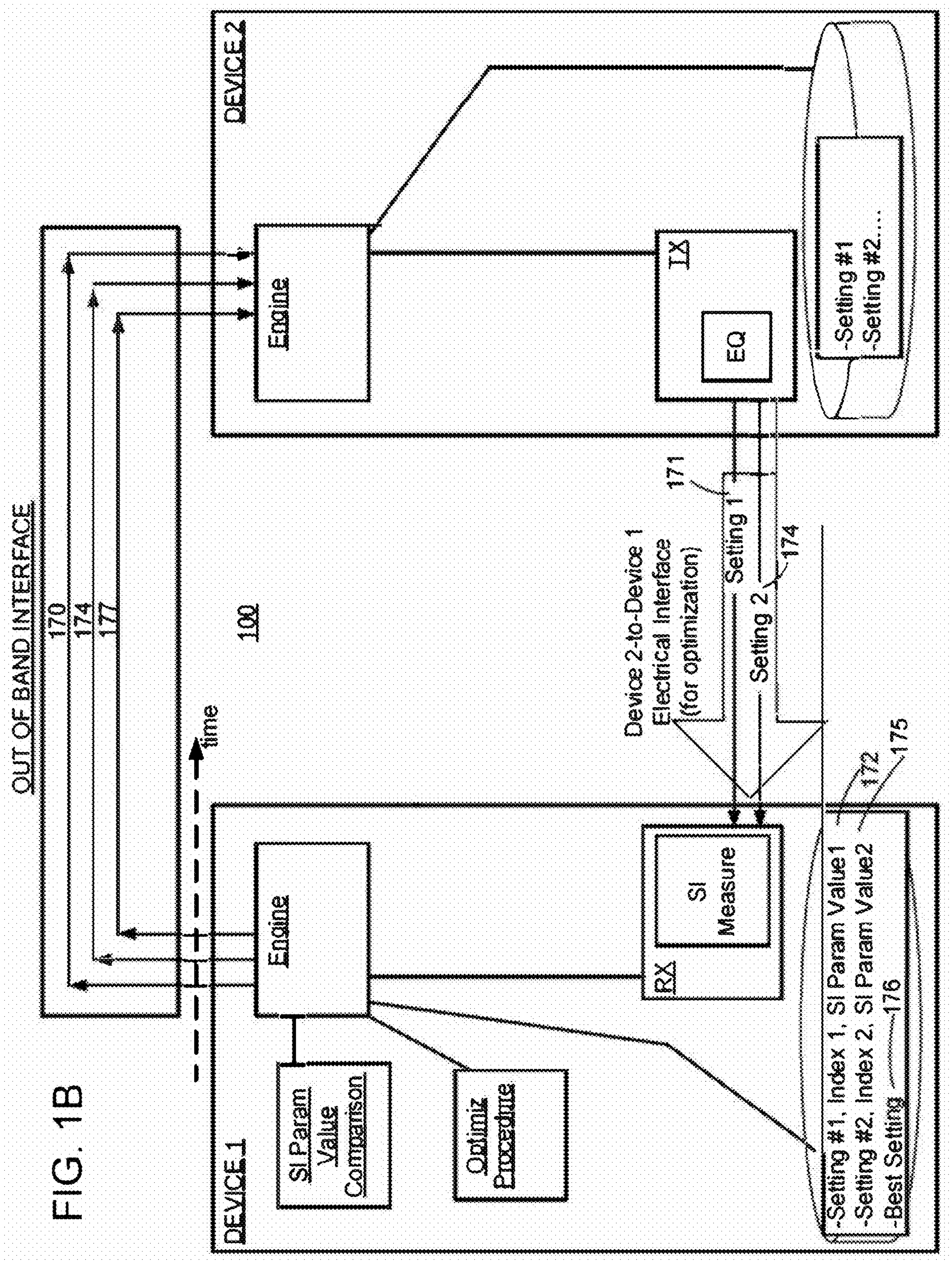
FIG. 1B is a simplified block diagram illustrating optimization of a second electrical path of the electrical interface of FIG. 1.

FIG. 1B is a simplified block diagram illustrating optimization of the second electrical path of the electrical interface of FIG. 1. Here, the optimization procedure is as follows.

At 170, device 1 uses OOB IF to ask module to set its TX EQ to value specified by setting #1.

At 171, device 2 sets Tx EQ to requested value.

At 172, device 1 tunes and record SI parameter in slot #1.

At 173, device 1 uses OOB IF to ask module to set its TX EQ to value specified by setting #2.

At 174, device 2 sets its Tx EQ to requested value.

At 175, device 1 tunes and records SI parameter in slot #2.

At 176, device 1 records which setting had best SI for future use.

At 177, device 1 uses OOB IF to ask device 2 to set its TX EQ to value specified by best setting.

At 180, device 2 sets Tx EQ to requested best value.

While the above has described a procedure involving optimization utilizing two settings for each interface, this is a simplification. The number of settings for optimizing each electrical interface is not limited to any particular number. Further details are now provided in connection with one exemplary embodiment.

EXAMPLE

An exemplary example is now described in connection with optimizing an electrical interface between a (first) optical host device and a (second) optical module device. In particular, advanced electrical interfaces (e.g., PAM4 50G) require good signal integrity at the host/module interface.

Figure 2:
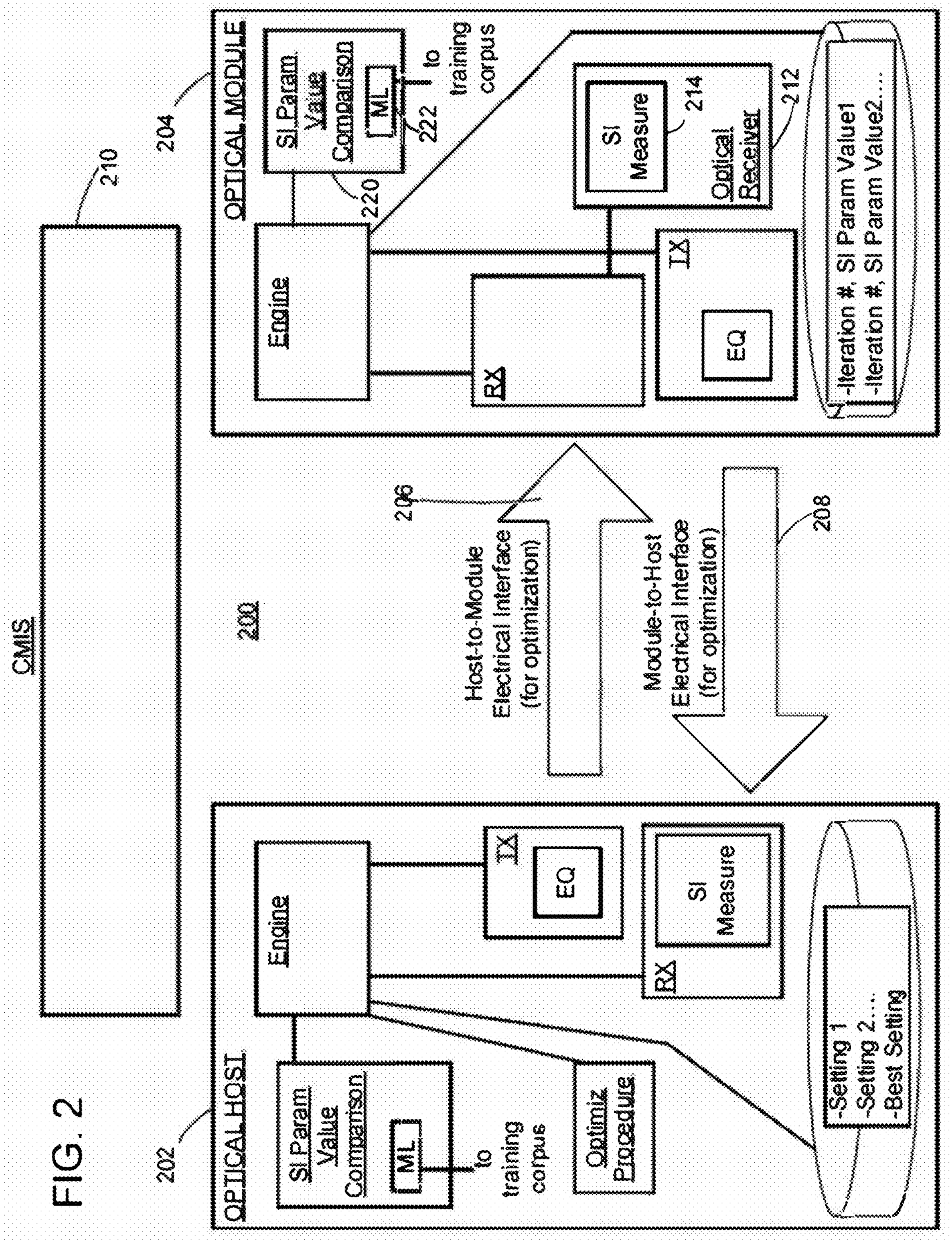
FIG. 2 is a simplified block diagram illustrating an exemplary electrical interface environment between an optical host device and an optical module device.

FIG. 2 is a simplified block diagram illustrating an exemplary electrical interface environment 200 between an optical host device 202 and an optical module device 204. A first electrical interface 206 is for communication of electrical signals from the host to the module. A second electrical interface 208 is for communicating electrical signals from the module to host.

As described below, this exemplary embodiment utilizes the CMIS standard as the out of band interface 210, with signals communicated thereover being according to the Common Data Block (CDB) format.

The optical module device includes an optical receiver component 212 to receive optical signals over a separate optical interface. That optical receiver component, may, for example, comprise a photodiode (PD).

Hence, the optical module device already typically includes an existing SI measurement capability 214 to determine the quality of the optical signals received. One particular example of such a SI measurement capability is a bit error rate (BER) estimated by a forward error correction (FEC) decoder.

As described extensively herein, an optimization procedure as implemented by embodiments may seek to leverage that existing SI measurement capability, in order to optimize communication across an electrical interface.

In particular, the transmitter of the host has capabilities to control signal integrity through FIR filters (pre- and post-cursor tap settings), and other Tx tuning parameters. Different channel conditions (e.g., electrical layout path from host ASIC to module ASIC) call for different settings of these parameters in order to provide optimal electrical signal integrity.

Accordingly, embodiments offer apparatuses and methods that optimize the electrical interface between a photoelectric module and a host. In particular, settings of an electrical transmitter at the photoelectric module are optimized at installation time. At the conclusion of the optimization process, the electrical interface that is optimized, can reliably be used for rapid exchange of information between the host and the module.

As noted in connection with the general embodiment of FIG. 1, the host and the module may feature corresponding elements that are configured to compare SI values in order to determine a best TX setting. As further shown in FIG. 2 and discussed in the following paragraphs, the comparator 220 may include a Machine Learning (ML) feature 222 trained by a training corpus. This ML feature may be referenced to allow determination of a best setting from calculation considering combination(s) of Digital Signal Processing (DSP) components.

Details regarding the process of checking SI for purposes of interface optimization (whether host-to-module, or module-to-host) is now discussed. In particular, determining which setting provides the best signal integrity can be achieved in several ways.

A first possible approach uses Signal-to-Noise Ratio (SNR) at a slicer. According to this methodology, the module can measure SNR at the end of the tuning process for each filter setting, and record this in a list indexed by the entry number of the filter. When the final filter has been configured, the module can search this list and determine which entry has the highest SNR. That entry with the highest SNR is then deemed the optimal filter solution.

In one variant upon this approach, the module can measure the SNR at several sampling times (or phases). A weighted averaging method may then be used to compute an overall SNR for each particular filter selection.

A possible second approach to SI checking, is to use Pulse Response to minimize Inter-Symbol Interference (ISI). According to this methodology, after tuning the module measures the pulse response and computes a cost function, e.g.:

$$C = \sum\nolimits_{i=0}^{N} h_i^2$$

where $h_i$=the pulse response of the ith cursor of the receiver, and the response of the main tap is excluded from the sum.

In this case, C is kept for each FIR setting of the transmitter. The FIR setting with the lowest value of C is the selection indicated to the host.

A variant of this technique may use a weighted sum in computation of cost function, e.g.:

$$C = \sum_{i=0}^{N} wi * h_i^2$$

Figure 6:
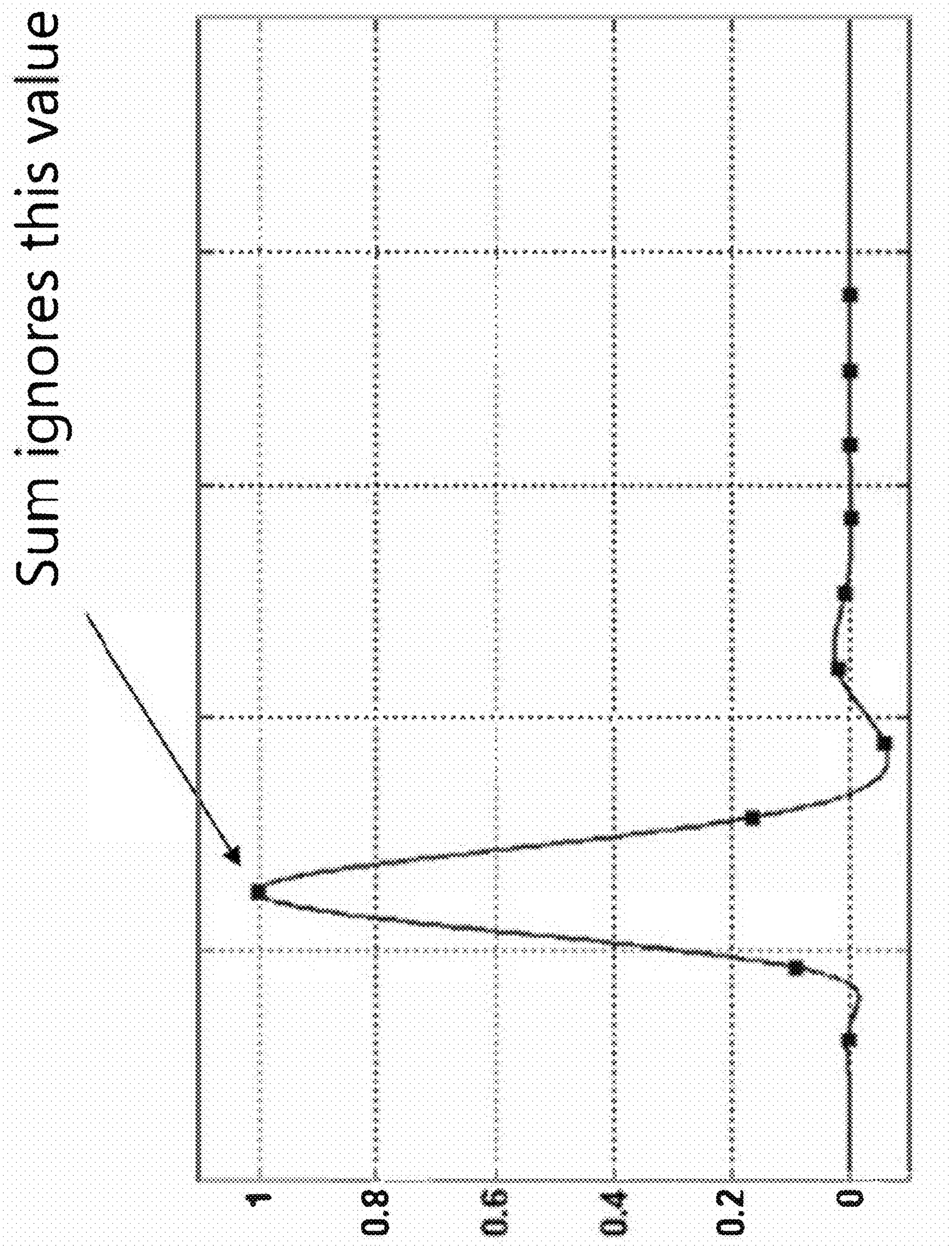
FIG. 6 is a plot of a pulse response example.

FIG. 6 is a plot of a pulse response example. This example shows a typical pulse response vector, with N=10. In this case, the sum would skip sample i=2, as indicated in the FIG. 6.

As mentioned above, third possible approach to determining SI, may employ a specific learning procedure—e.g., Machine Learning (ML). That learning procedure may be trained over a large number of host and module systems and/or simulations. A cost function and/or SNR function can be computed which provides the strongest indication of signal integrity.

Details regarding this exemplary embodiment's use of the CMIS and the Common Data Block (CDB) to send commands over the out of band interface, are now discussed. The CDB provides closed-loop handshake. Each iteration of the optimization process is encompassed in a single CDB command.

The parameters are as follows. The Iteration Number parameter starts from 1, and ends at a total number. Where tuning is per-lane (see below), the lane number(s) to be tuned represent another parameter. The Total Number of Iterations parameter remains the same during the process.

The module then responds by re-initializing DSP tuning (e.g., on each selected lane). The module waits until DSP has converged sufficiently for SI analysis (e.g., on all selected lanes). The SI parameter is then recorded (e.g., for each selected lane).

If the iteration number==Total number of iterations, then the module also responds with the iteration number that had the best SI analysis results (e.g., for each selected lane independent of the other lanes).

The module then indicates command complete to host.

The host then moves on to next setting, and continues until complete.

Details of the CDB command structure for Host-to-Module Optimization, are now described. In particular, CMIS CDB provides host-to-module parameters and module-to-host response parameters.

For each command, the host passes the total number (N) of filter settings that will be attempted, and the current index (i).

For each command, the module will tune to the new electrical signal and record the optimizing function value.

When i==N, the module will report the best i.

If there was a problem tuning, then Current Status will indicate such.

| Register Address | Description |
|---|---|
| 9Fh.136 | Total number of FIR settings (N) |
| 9Fh.137 | Current FIR setting number (i = 1 . . . N) |
| 9Fh.138 | Current Status |
| | 0 = Tuning ok for this setting |
| | 1 = Tuning error for this setting |
| 9Fh.139 | Best Index |
| | 0 = Current FIR setting number < N |
| | [1 . . . N] = indicates which setting i was best |

It is noted that CMIS allows for per-lane tuning. Thus, the following shows possible register addresses that may be used in such an approach.

| Register Address | Description |
|---|---|
| 9Fh.136 | Total number of FIR settings (N) |
| 9Fh.137 | Current FIR setting number (i = 1 . . . N) |
| 9Fh.138 | Bitmap of selected lanes |
| 9Fh.139 | Bitmap of Tuning OK for each lane |
| | 0 = Tuning ok for this setting |
| | 1 = Tuning error for this setting |

-continued

| Register Address | Description |
|---|---|
| 9Fh.140-147 | Best Index for each lane<br>0 = Current setting number < N<br>[1 . . . N] = indicates which setting i was best |

Details of possible CMIS for Module-To-Host Optimization, are now discussed. For module-to-host optimization, the procedure is similar, but the computation is done by the host side, e.g., as follows.

Figure 5:
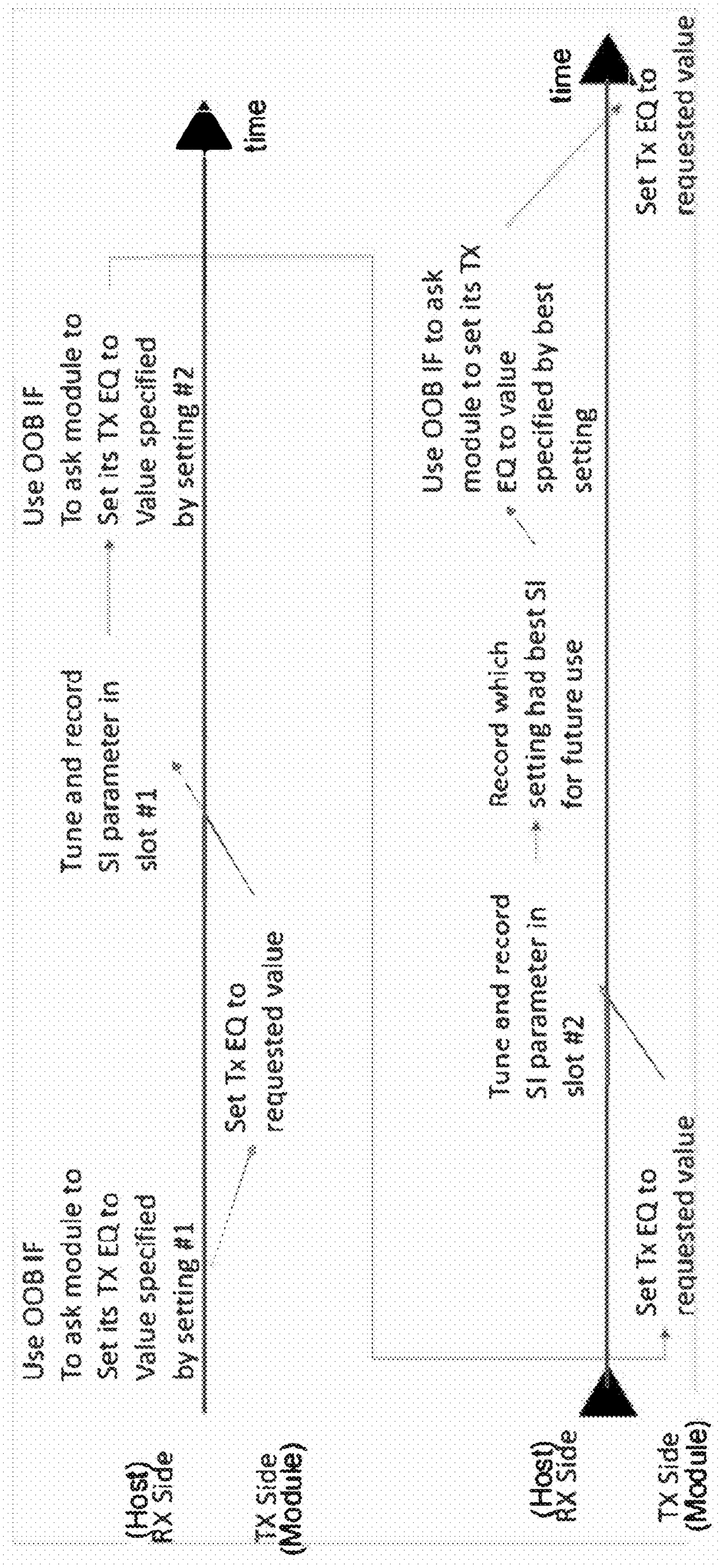
FIG. 5 is a simplified flow diagram illustrating optimization of a module-to-host electrical path of an interface between an optical host device and an optical module device.

1. Set the module FIR setting
2. Tune the host system
3. Record the SI parameter at the host
4. Repeat through all FIR settings
5. Install and record best FIR setting into the module This is summarized in the flow diagram of FIG. 5.

For CMIS modules, access is to set a FIR setting into the module. This feature is available using, e.g., register 10h.162-10h.169, "Rx output equalization pre-cursor" and "Rx output equalization post-cursor".

Figure 3:
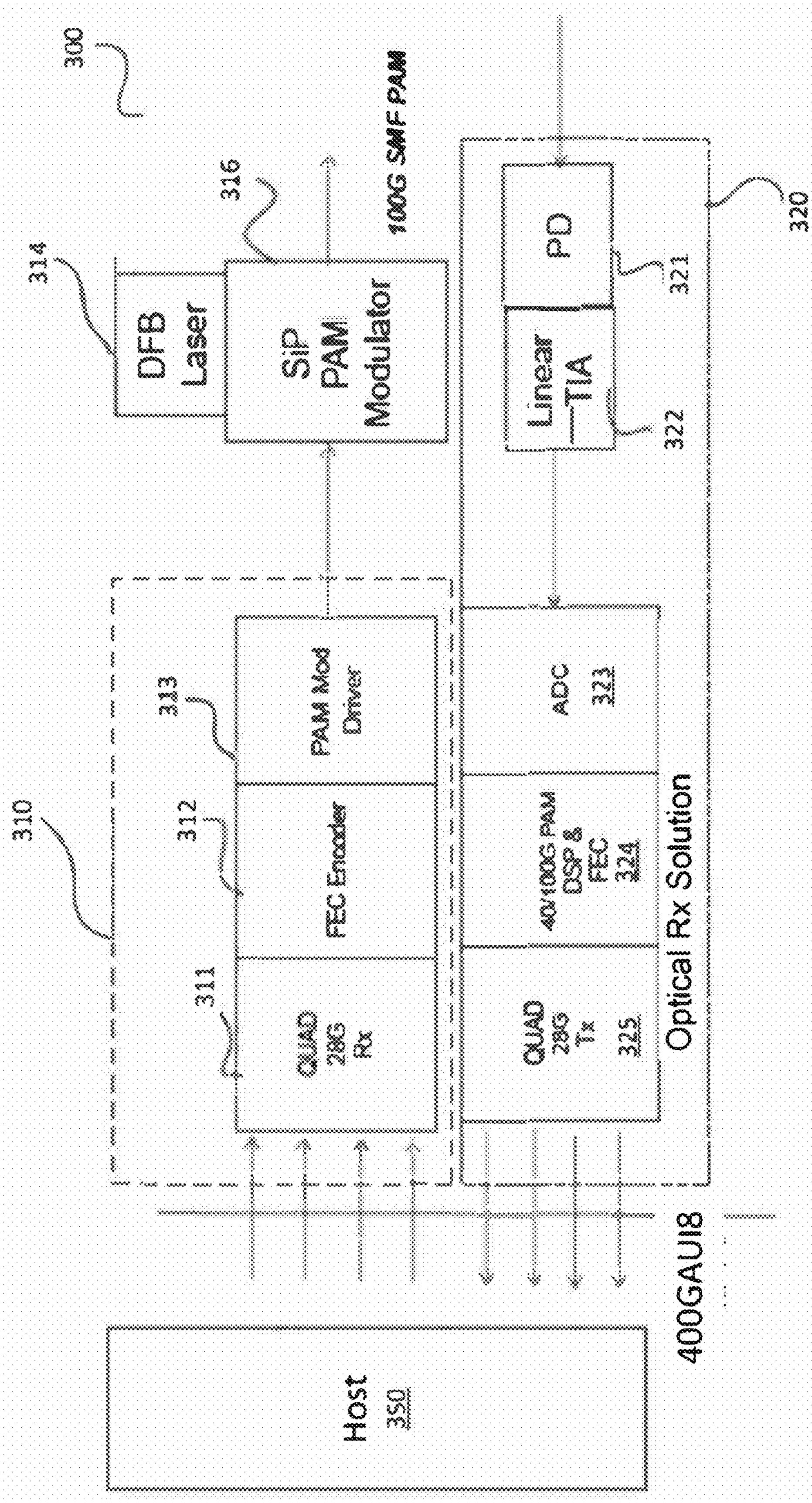
FIG. 3 is a simplified diagram illustrating an electrical interface between an optical host device and an optical module device.
Figure 4:
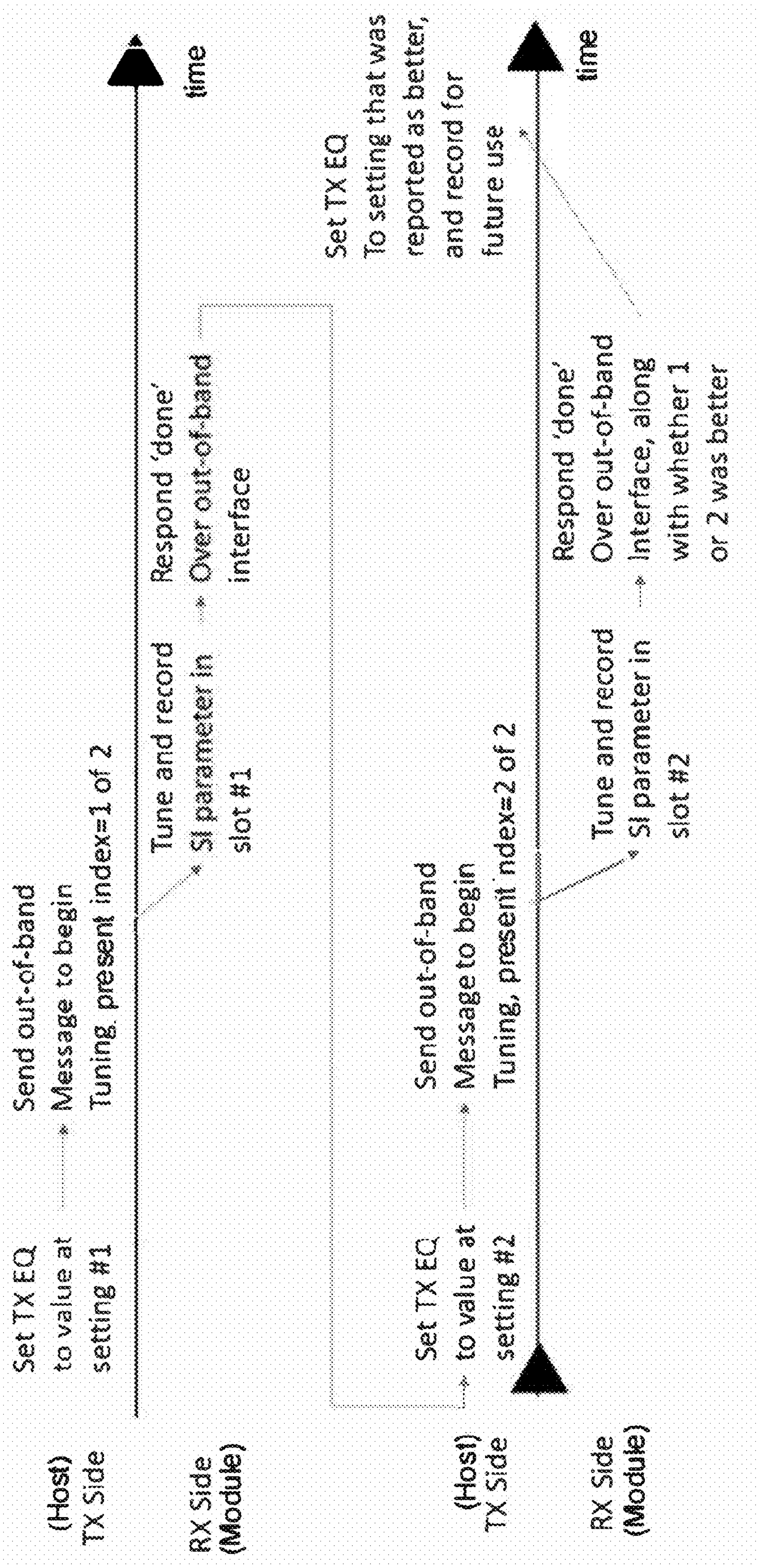
FIG. 4 is a simplified flow diagram illustrating optimization of a host-to-module electrical path of an interface between an optical host device and an optical module device.

FIG. 3 is a simplified diagram illustrating details of an embodiment of an optical communication module 300. This diagram is merely one example, which should not unduly limit the scope of the claims. One of ordinary skill in the art would recognize many variations, alternatives, and modifications. The communication module 300 includes transmitter element 310 and a receiver element 320. The transmitter element 310 comprises a receiver 311, encoder 312, and PAM modulation driver 313.

In an embodiment, the communication module 300 is configured to receive incoming data at through four channels, where each channel is configured at 25 gigabits/s and configured as a PAM-2 format. Using the transmitter element 310, modulator 316, and the laser 314, the communication module 300 processes data received at 25 gigabits/s from each of the four incoming channels, and transmits PAM modulated optical data stream at a bandwidth of 100 gigabits/s. It is to be appreciated that other bandwidths are possible as well, such as 40 Gbps, 400 Gbps, and/or others.

As shown the transmitter element 310 receives 4 channels of data. It is to be appreciated that other variants of pulse-amplitude modulation (e.g., PAM4, PAM8, PAM12, PAM16, etc.), in addition to PAM-2 format, may be used as well. The transmitter element 310 comprises functional block 311, which includes a clock data recovery (CDR) circuit configured to receive the incoming data from the four communication channels. In various embodiments, the functional block 311 further comprises multiplexer for combining 4 channels for data. For example, data from the 4 channels as shown are from the PCE-e interface. For example, the interface to host 350 is connected to one or more processors. In a specific embodiment, two 2:1 multiplexers are employed in the functional block 311. For example, the data received from the four channels are high-speed data streams that are not accompanied by clock signals. The receiver 311 comprises, among other things, a clock signal that is associated with a predetermined frequency reference value. In various embodiments, the receiver 311 is configured to utilize a phase-locked loop (PLL) to align the received data.

The transmitter element 310 further comprises an encoder 312. As shown in FIG. 3, the encoder 312 comprises a forward error correction (FEC) encoder. Among other things, the encoder 312 provides error detection and/or correction as needed. For example, the data received may be a PAM-2 format as described above. The received data comprises redundancy (e.g., one or more redundant bits) helps the encoder 312 to detect errors. In a specific embodiment, low-density parity check (LDPC) codes are used. The encoder 312 is configured to encode data received from four channels as shown to generate a data stream that can be transmitted through optical communication link at a bandwidth 100 gigabits/s (e.g., combining 4 channels of 25 gigabits/s data). For example, each received is in the PAM-2 format, and the encoded data stream is a combination of four data channels and is in PAM-8 format. Data encoding and error correction are used under PAM format.

The PAM modulation driver 313 is configured to drive data stream encoded by the encoder 312. In various embodiments, the receiver 311, encoder 312, and the modulation driver 313 are integrated and part of the transmitter element 310. Details regarding an example of a PAM modulation driver according to particular embodiments, are disclosed in U.S. Nonprovisional patent application Ser. No. 14/798,322, filed Jul. 13, 2015 and incorporated by reference in its entirety herein for all purposes.

The PAM modulator 316 is configured to modulate signals from the transmitter module 310, and convert the received electrical signal to optical signal using the laser 314. For example, the modulator 316 generates optical signals at a transmission rate of 100 gigabits per second. It is to be appreciated that other rate are possible as well, such as 40 Gbps, 400 Gbps, or others. The optical signals are transmitted in a PAM format (e.g., PAM-8 format, PAM12, PAM 16, etc.). In various embodiments, the laser 314 comprises a distributed feedback (DFB) laser. Depending on the application, other types of laser technology may be used as well, as such vertical cavity surface emitting laser (VCSEL) and others.

This particular communication module 300 is configured for both receiving and transmitting signals. A receiver element 320 comprises a photo detector 321 that converts incoming data signal in an optical format converts the optical signal to an electrical signal. In various embodiments, the photo detector 321 comprises indium gallium arsenide material. For example, the photo detector 321 can be a semiconductor-based photodiode, such as p-n photodiodes, p-i-n photodiodes, avalanche photodiodes, or others. The photo detector 321 is coupled with an amplifier 322. In various embodiments, the amplifier comprises a linear transimpedance amplifier (TIA). It is to be appreciated by using TIA, long-range multi-mode (LRM) at high bandwidth (e.g., 100 Gb/s or even larger) can be supposed. For example, the TIA helps compensate for optical dispersion in electrical domain using electrical dispersion compensation (EDC). In certain embodiments, the amplifier 322 also includes a limiting amplifier. The amplifier 322 is used to produce a signal in the electrical domain from the incoming optical signal. In certain embodiments, further signal processing such as clock recovery from data (CDR) performed by a phase-locked loop may also be applied before the data is passed on.

The amplified data signal from the amplifier 322 is processed by the analog to digital converter (ADC) 323. In a specific embodiment, the ADC 323 can be a baud rate ADC. For example, the ADC is configured to convert the amplified signal into a digital signal formatted into a 100 gigabit per second signal in a PAM format. The functional block 324 is configured to process the 100 Gb/s data stream and encode it into four at streams at 25 Gb/s each. For example, the incoming optical data stream received by the photo detector 321 is in PAM-8 format at a bandwidth of 100

Gb/s, and at block 324 four data streams in PAM-2 format is generated at a bandwidth of 25 Gb/s.

The four data streams are transmitted by the electrical transmitter 325 across an optimized electrical interface over 4 communication channels at 25 Gb/s.

It is to be appreciated that there can be many variations to the embodiments described in FIG. 3. For example, FIG. 3 represents a simplified diagram showing PAM encoding. However, this is not required and alternative embodiments may utilize different schemes.

Also, a different number of channels (e.g., 4, 8, 16, etc.) and different bandwidth (e.g., 10 Gb/s, 40 Gb/s, 100 Gb/s, 400 Gb/s, 3.2 Tb/s, etc.) can be used as well, depending on the application (e.g., server, leaf switch, spine switch, etc.).

In operation, the communication module 300 sends optical signal to another communication interface. More specifically, the transmitter module of one network interface sends signals over optical network to the receiver module of another network interface. More specifically, electrical signals are modulated and converted to optical signals. For example, the PAM modulation driver 313 sends PAM modulated electrical signals to the PAM modulator 316, which, together with the laser source 314, sends modulated optical signals out. It is to be appreciated that modulated optical signals according to embodiments may be modulated both in amplitude and phase.

While the above is a full description of the specific embodiments, various modifications, alternative constructions and equivalents may be used. Given the various applications and embodiments as described herein, the above description and illustrations should not be taken as limiting the scope of the present invention which is defined by the appended claims.

What is claimed is:

1. A first host device governing operation of an optical module, the first host device comprising:

a transmitter configured to transmit in-band signals on an in-band electrical interface from the first host device to the optical module, wherein the first host device communicates with a second host device over an optical medium via the optical module, wherein the communication with the second host device includes transmission by the optical module of optical signals to the second host device, wherein the second host device is remotely located from the first host device, and wherein the optical signals are generated based on the in-band signals from the first host device;

an out-of-band electrical interface configured to transmit first out-of-band messages from the first host device to the optical module, and receive second out-of-band messages from the optical module; and an engine configured i) to transmit via the transmitter one of the in-band signals on the in-band electrical interface to the optical module, ii) to receive feedback from the optical module via the out-of-band electrical interface, the feedback being based on the one of the in-band signals, and iii) to tune the transmitter of the first host device based on the feedback.

2. The first host device of claim 1, wherein:

the in-band electrical interface is a high-speed interface transmitting at least one of the in-band signals at 50 gigabits per second; and the out-of-band electrical interface is reliable for communication of management messages between the first host device and the optical module.

3. The first host device of claim 2, wherein the first host device controls the out-of-band electrical interface.

4. The first host device of claim 1, wherein the engine is configured i) to perform a plurality of tests to select from a plurality of transmitter settings a resultant transmitter setting of the transmitter, ii) subsequent to performing the plurality of tests, receive via the out-of-band electrical interface one of the second out-of-band messages including an indication of the resultant transmitter setting, and iii) subsequent to performing the plurality of tests, receive via the out-of-band electrical interface one of the second out-of-band messages including an indication of the resultant transmitter setting.

5. The first host device of claim 4, wherein:

each of the plurality of tests include the engine a) setting the transmitter to a respective one of the plurality of transmitter settings, b) transmitting via the out-of-band electrical interface a respective one of the first out-of-band messages to the optical module to tune the optical module for reception of a respective one of the in-band signals on the in-band electrical interface, and c) transmitting the respective one of the in-band signals via the transmitter to the optical module;

the respective one of the first out-of-band messages includes an indication of the respective one of the plurality of transmitter settings to test for a current one of the plurality of tests; and the resultant transmitter setting provides a signal integrity value greater than other signal integrity values provided respectively by the other ones of the plurality of transmitter settings.

6. The first host device of claim 4, wherein the engine performs the plurality of tests to select the resultant transmitter setting to maximize signal integrity of at least one of the in-band signals.

7. The first host device of claim 4, wherein the engine is configured to, for each current one of the plurality of tests, transmit via the out-of-band electrical interface a respective one of the first out-of-band messages including at least one of i) an index value indicative of a respective one of the plurality of transmitter settings to test for the current one of the plurality of tests, and ii) the respective one of the plurality of transmitter settings to test for the current one of the plurality of tests.

8. The first host device of claim 7, wherein the engine is configured to receive via the out-of-band electrical interface one of the index values as the indication of the resultant transmitter setting.

9. The first host device of claim 8, wherein the one of the index values is a testing iteration identifier indicating a number of the one of the plurality of tests associated with testing the resultant transmitter setting.

10. The first host device of claim 4, wherein the engine is configured, for each of the plurality of tests, to test a respective one or more filter parameters of the transmitter.

11. The first host device of claim 4, wherein:

the transmitter comprises a finite impulse response filter having a plurality of taps; and the engine is configured, for each of the plurality of tests, to test respective pre-cursor values and post cursor values of the plurality of taps of the finite impulse response filter, the pre-cursor and post cursor values being coefficients for at least one of emphasis and deemphasis.

12. The first host device of claim 4, wherein the engine is configured, for two or more tests among the plurality of tests, to test one or more amplitudes of the transmitter for transmission of a respective one of the in-band signals.

13. The first host device of claim 4, wherein the engine is configured, for each respective one of the plurality of tests, to transmit via the transmitter a respective one of the first out-of-band messages from the first host device to the optical module, the respective one of the first out-of-band messages comprising an index value identifying the transmitter setting of the transmitter for the respective one of the plurality of tests being performed.

14. The first host device of claim 4, wherein the engine is configured, for each respective one of the plurality of tests, to transmit via the transmitter a respective one of the first out-of-band messages from the first host device to the optical module, the respective one of the first out-of-band messages comprising the transmitter setting of the transmitter for the respective one of the plurality of tests being performed.

15. The first host device of claim 4, wherein the engine is configured i) for each respective one of the plurality of tests, to transmit via the out-of-band electrical interface a respective index value from the first host device to the optical module identifying the respective one of the plurality of tests, ii) to receive via the out-of-band electrical interface and at completion of the plurality of tests, the one of the index values identifying the resultant transmitter setting of the transmitter, and iii) in response to receiving the one of the index values, to adjust one or more parameters of the transmitter according to one or more setting values corresponding to the one of the index values.

16. The first host device of claim 4, wherein the engine is configured to i) transmit from the first host device to the optical module and via the out-of-band electrical interface a total quantity of transmitter settings to be tested, and, prior to each of the plurality of tests, an index value for a next one of the plurality of tests to be performed, ii) upon completion of testing the total quantity of transmitter settings, to receive via the out-of-band electrical interface one of the index values for the resultant transmitter setting, and iii) in response to receiving the one of the index values for the resultant transmitter setting, to adjust one or more parameters of the transmitter according to one or more setting values associated with the one of the index values.

17. The first host device of claim 4, wherein the engine is configured to i) transmit from the first host device to the optical module and via the out-of-band electrical interface a total quantity of transmitter settings to be tested, and, prior to each of the plurality of tests, a testing iteration identifier for a next one of the plurality of tests to be performed, ii) at completion of testing the total quantity of transmitter settings, to receive via the out-of-band electrical interface the testing iteration identifier indicative of the one of the plurality of tests associated with testing the resultant transmitter setting, and iii) in response to receiving the testing iteration identifier, to adjust one or more parameters of the transmitter according to one or more setting values associated with the resultant transmitter setting.

* * * * *